(12) United States Patent
Brizendine et al.

(10) Patent No.: US 11,701,956 B2
(45) Date of Patent: Jul. 18, 2023

(54) AXLE INCLUDING A DRIVE SYSTEM FOR AN ELECTRIC VEHICLE

(71) Applicant: GM GLOBAL TECHNOLOGY OPERATIONS LLC, Detroit, MI (US)

(72) Inventors: Chad R. Brizendine, Fenton, MI (US); Bhapinder Puri, Troy, MI (US); Hai Xu, Northville, MI (US); Dan E. Revers, Holly, MI (US); William Matzen, Walled Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 357 days.

(21) Appl. No.: 17/060,201

(22) Filed: Oct. 1, 2020

(65) Prior Publication Data
US 2022/0105790 A1   Apr. 7, 2022

(51) Int. Cl.
*B60K 1/00* (2006.01)
*B60K 11/00* (2006.01)
*F16H 57/02* (2012.01)
*F16H 57/025* (2012.01)
*F16H 57/04* (2010.01)

(52) U.S. Cl.
CPC ............... *B60K 1/00* (2013.01); *B60K 11/00* (2013.01); *F16H 57/02* (2013.01); *F16H 57/025* (2013.01); *F16H 57/0412* (2013.01); *F16H 57/0476* (2013.01); *B60K 2001/001* (2013.01); *F16H 2057/02034* (2013.01); *F16H 2057/02052* (2013.01)

(58) Field of Classification Search
CPC .... B60K 1/00; B60K 2001/001; F16H 57/025
See application file for complete search history.

(56) References Cited

U.S. PATENT DOCUMENTS

| | | | | |
|---|---|---|---|---|
| 7,232,398 | B2* | 6/2007 | Garcia | B60B 35/16 475/221 |
| 7,559,390 | B2* | 7/2009 | Marsh | B60K 17/26 180/56 |
| 11,420,514 | B2* | 8/2022 | Ellis | B60K 7/0007 |
| 2013/0281248 | A1* | 10/2013 | Cha | F16H 48/42 475/150 |
| 2014/0333162 | A1* | 11/2014 | Karlsson | B60L 15/2054 310/71 |
| 2018/0257485 | A1* | 9/2018 | Vincon | B60K 1/04 |
| 2019/0296605 | A1* | 9/2019 | Okuhata | H02K 7/006 |
| 2020/0156707 | A1* | 5/2020 | Kandori | B60K 5/12 |
| 2021/0078397 | A1* | 3/2021 | Ito | B60K 5/1216 |
| 2022/0097518 | A1* | 3/2022 | Stadtfeld | B60K 17/354 |

* cited by examiner

*Primary Examiner* — Brian L Swenson
(74) *Attorney, Agent, or Firm* — Cantor Colburn LLP

(57) ABSTRACT

A drive system for an electric vehicle includes a housing having a first housing portion, a second housing portion connected to the first housing portion, and a third housing portion connected to the second housing portion. The third housing portion includes a torque arm connectable to a vehicle chassis. A hypoid gear set is mounted in the first housing portion, and an electric motor is mounted in the third housing portion.

20 Claims, 2 Drawing Sheets

AXLE INCLUDING A DRIVE SYSTEM FOR AN ELECTRIC VEHICLE

INTRODUCTION

The subject disclosure relates to motor vehicles and, more particularly, to an axle including a drive system for an electric vehicle.

Many electric vehicles include an electric motor that is connected to drive wheels through a transmission. Often times, the transmission takes the form of a transaxle that connects to the drive wheels. The use of a transaxle mechanically isolates the electric motor from suspension components. In vehicles that include a beam axle, suspension jounce may affect various components of the electric motor. For example, power cables, cooling lines, and other connected elements may experience mechanical fatigue when exposed to jounce forces. Accordingly, it is desirable to provide an electric vehicle having a beam axle with a system for isolating motor connections from jounce.

SUMMARY

In one exemplary embodiment, a drive system for an electric vehicle includes a housing having a first housing portion, a second housing portion connected to the first housing portion, and a third housing portion connected to the second housing portion. The third housing portion includes a torque arm connectable to a vehicle chassis. A hypoid gear set is mounted in the first housing portion, and an electric motor is mounted in the third housing portion.

In addition to one or more of the features described above or below, or as an alternative, further embodiments could include a speed reduction system mounted in the first housing portion and connected to the hypoid gear set.

In addition to one or more of the features described above or below, or as an alternative, further embodiments could include wherein the speed reduction system comprises a planetary gear set.

In addition to one or more of the features described above or below, or as an alternative, further embodiments could include wherein the planetary gear set comprises a two-speed transmission.

In addition to one or more of the features described above or below, or as an alternative, further embodiments could include wherein the second housing comprises a torque tube.

In addition to one or more of the features described above or below, or as an alternative, further embodiments could include a drive shaft extending from the electric motor toward the hypoid gear set through the torque tube.

In addition to one or more of the features described above or below, or as an alternative, further embodiments could include wherein the torque arm includes a first torque arm and a second torque arm, each of the first and second torque arms being pivotally connectable to the vehicle chassis.

In addition to one or more of the features described above or below, or as an alternative, further embodiments could include a bushing mounted in the torque arm, the bushing allowing the housing to pivot relative to the vehicle chassis.

In addition to one or more of the features described above or below, or as an alternative, further embodiments could include a connector mounted to the third housing portion, the connector providing an electrical and a cooling interface for the electric motor.

In addition to one or more of the features described above or below, or as an alternative, further embodiments could include wherein the first housing portion, the second housing portion and the third housing portion extend along a longitudinal axis.

In another exemplary embodiment, a vehicle includes a chassis, a body supported by the chassis, and a drive system. The drive system includes a housing having a first housing portion, a second housing portion connected to the first housing portion, and a third housing portion connected to the second housing portion. The third housing portion includes a torque arm connected to the chassis. A hypoid gear set is mounted in the first housing portion, and an electric motor is mounted in the third housing portion.

In addition to one or more of the features described above or below, or as an alternative, further embodiments could include a speed reduction system mounted in the first housing portion and connected to the hypoid gear set.

In addition to one or more of the features described above or below, or as an alternative, further embodiments could include wherein the speed reduction system comprises a planetary gear set.

In addition to one or more of the features described above or below, or as an alternative, further embodiments could include wherein the planetary gear set comprises a two-speed transmission.

In addition to one or more of the features described above or below, or as an alternative, further embodiments could include wherein the second housing comprises a torque tube.

In addition to one or more of the features described above or below, or as an alternative, further embodiments could include a drive shaft extending from the electric motor toward the hypoid gear set through the torque tube.

In addition to one or more of the features described above or below, or as an alternative, further embodiments could include wherein the torque arm includes a first torque arm and a second torque arm, each of the first and second torque arms being pivotally connectable to the vehicle chassis.

In addition to one or more of the features described above or below, or as an alternative, further embodiments could include a bushing mounted in the torque arm, the bushing allowing the housing to pivot relative to the vehicle chassis.

In addition to one or more of the features described above or below, or as an alternative, further embodiments could include a connector mounted to the third housing portion, the connector providing an electrical and a cooling interface for the electric motor.

In addition to one or more of the features described above or below, or as an alternative, further embodiments could include wherein the first housing portion, the second housing portion and the third housing portion extend along a longitudinal axis.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
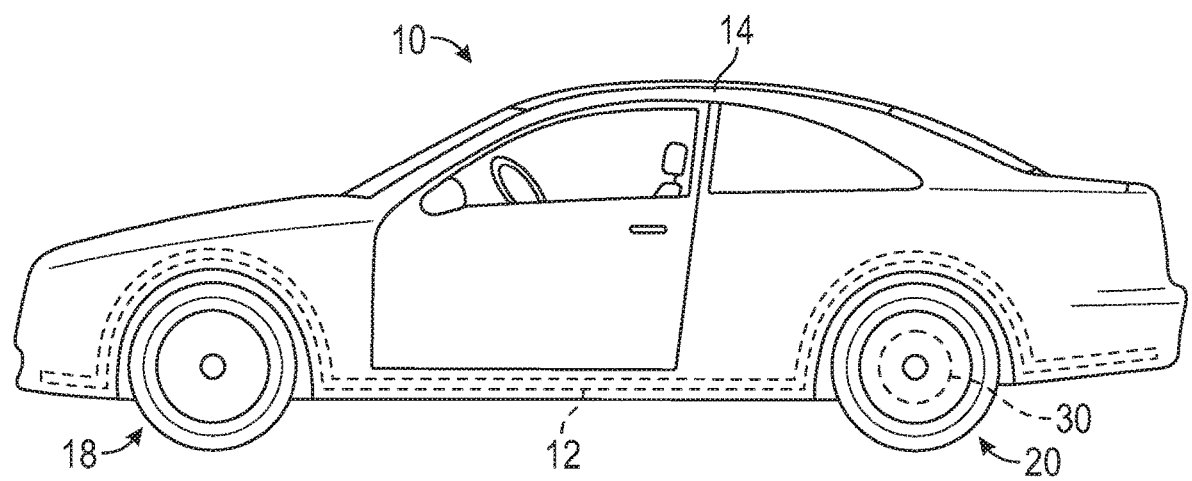
FIG. 1 is a side view of a vehicle including an axle having a drive system, in accordance with an exemplary aspect.

The following description is merely exemplary in nature and is not intended to limit the present disclosure, its application or uses. It should be understood that throughout the drawings, corresponding reference numerals indicate like or corresponding parts and features.

A vehicle, in accordance with an exemplary embodiment, is indicated generally at 10 in FIG. 1. Vehicle 10 includes a chassis 12 that supports a body 14, a pair of front wheels 18 and a pair of rear wheels 20. Rear wheels 20 are connected to chassis 12 through a drive system 30. As will be detailed herein, drive system 30 provides power to rear wheels 20 and may also articulate relative to chassis 12 so as to absorb jounce/rebound (up and down) as well as side forces on vehicle 10. At this point, it should be understood that while described as providing power to rear wheels 20, drive system 30 may be configured to provide power to front wheels 18.

Figure 2:
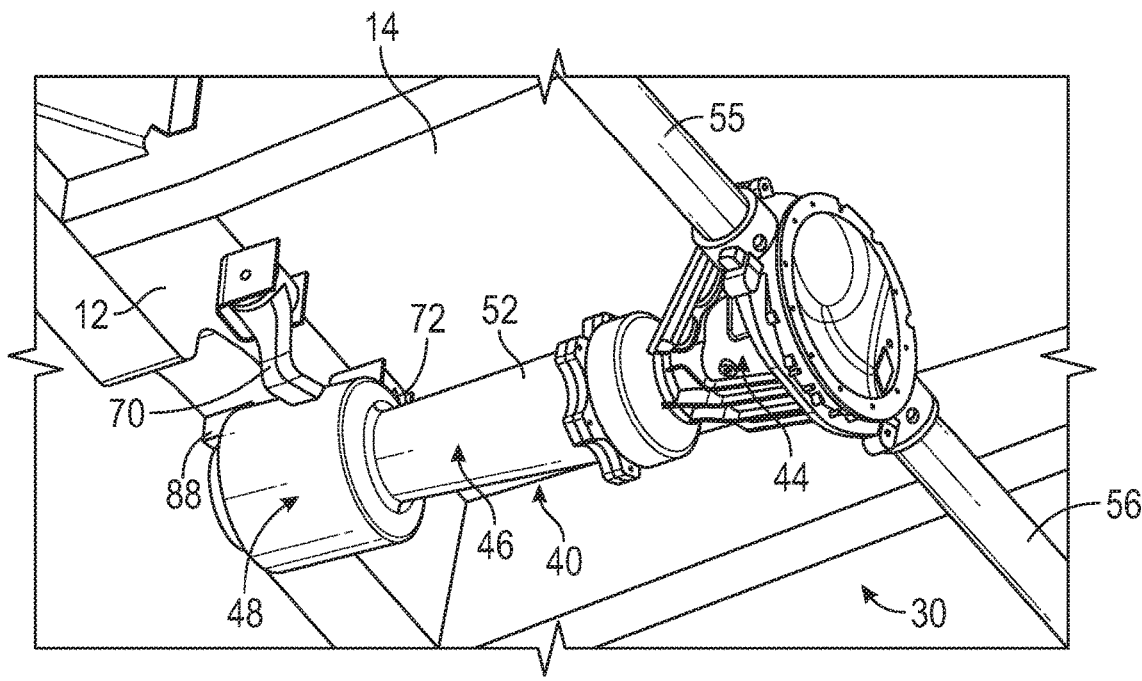
FIG. 2 is a perspective view of the axle having the drive system of FIG. 1, in accordance with an exemplary aspect.
Figure 3:
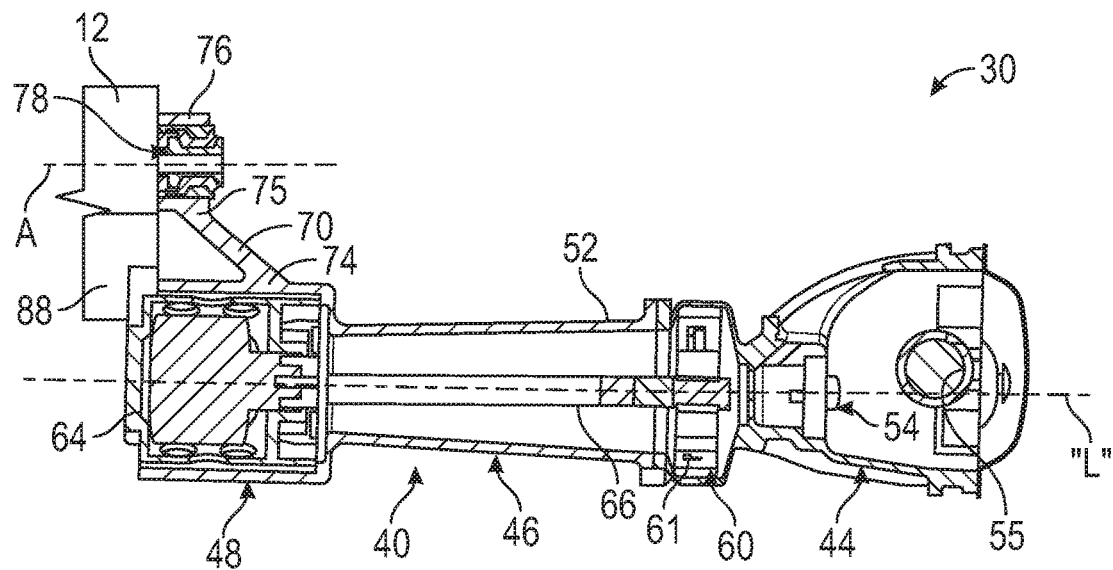
FIG. 3 is a side glass view of the axle having the drive system of FIG. 2, in accordance with an exemplary aspect.

Referring to FIGS. 2 and 3, drive system 30 includes a housing 40 having a first housing portion 44, a second housing portion 46, and a third housing portion 48 that extends along a longitudinal axis "L". Second housing portion 46 takes the form of a torque tube 52 that connects first housing portion 44 and third housing portion 48. First housing portion 44 defines a beam axle and encloses a hypoid gear set 54 that is connected to a first axle 55 and a second axle 56. First axle 55 may be coupled to one of the rear wheels 20 and second axle 56.

First housing portion 44 also encloses a gear reduction system 60 that is coupled to hypoid gear set 54. Gear reduction system 60 may take the form of a planetary gear set 61. Gear reduction system 60 is coupled to an electric motor 64 housed in third housing portion 48 via a drive shaft 66 that extends through torque tube 52. Planetary gear set 61, in an exemplary aspect, may take the form of a two-speed transmission that limits rotational speed generated by electric motor 64 passing to hypoid gear set 54. At this point, it should be understood that the gear reduction system may take on various forms including a constant velocity transmission (CVT), a standard helical gear set, a stacked gear set or the like.

In an exemplary embodiment, drive system 30 is secured to chassis 12 through an articulating connection that includes a first torque arm 70 and a second torque arm 72. Reference will now follow to FIG. 3 in describing first torque arm 70 with an understanding that second torque arm 72 includes similar structure. First torque arm 70 includes a first end 74 coupled to third housing portion 48 and a second end 75 connected to chassis 12. More specifically, second end 75 includes a bushing receiver 76 that supports a bushing 78 which provides a flexible interface to chassis 12. That is, housing 40 may articulate about all rotational degrees of freedom relative to an axis "A" that extends through bushing 78 in response to various road conditions.

Housing 40 also includes an electrical/cooling connector 88 that guides electrical conductors and/or cooling conduits (not shown) between chassis 12 and electric motor 64. Connector 88 is arranged directly adjacent torque arms 70 and 72 so as to reduce forces upon and mitigate wear of electrical and cooling components. By allowing the electric motor and other drive components to articulate relative to the chassis the need for additional joints is eliminated. Further, by positioning the connector near the toque arms, the beam axle may respond to jounce and rebound forces as well as side-to-side movement without putting undesirable stress on drive components, electrical cables, and/or cooling lines.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A drive system for an electric vehicle comprising:
 a housing having a first housing portion, a second housing portion connected to the first housing portion, and a third housing portion connected to the second housing portion, the third housing portion including a torque arm connectable to a vehicle chassis;
 a hypoid gear set mounted in the first housing portion; and
 an electric motor mounted in the third housing portion, the electric motor including an axis of rotation that extends from the third housing portion, through the second housing portion towards the first housing portion, the torque arm including a support axis that, when connected to a vehicle, is perpendicular relative to the axis of rotation of the electric motor.

2. The drive system according to claim 1, further comprising a speed reduction system mounted in the first housing portion and connected to the hypoid gear set.

3. The drive system according to claim 2, wherein the speed reduction system comprises a planetary gear set.

4. The drive system according to claim 3, wherein the planetary gear set comprises a two-speed transmission.

5. The drive system according to claim 1, wherein the second housing portion comprises a torque tube.

6. The drive system according to claim 5, further comprising a drive shaft extending from the electric motor toward the hypoid gear set through the torque tube.

7. The drive system according to claim 1, wherein the torque arm includes a first torque arm and a second torque arm, each of the first and second torque arms being pivotally connectable to the vehicle chassis.

8. The drive system according to claim 1, further comprising a bushing mounted in the torque arm, the bushing allowing the housing to pivot about the support axis relative to the vehicle chassis.

9. The drive system according to claim 1, further comprising a connector mounted to the third housing portion, the connector providing an electrical and a cooling interface for the electric motor.

10. The drive system according to claim 1, wherein the first housing portion, the second housing portion and the third housing portion extend along a longitudinal axis that is coincident with the axis of rotation of the electric motor.

11. A vehicle comprising:
a chassis;
a body supported by the chassis; and
a drive system comprising:
a housing having a first housing portion, a second housing portion connected to the first housing portion, and a third housing portion connected to the second housing portion, the third housing portion including a torque arm connected to the chassis;
a hypoid gear set mounted in the first housing portion; and
an electric motor mounted in the third housing portion, the electric motor including an axis of rotation that extends from the third housing portion, through the second housing portion towards the first housing portion, the torque arm including a support axis that is perpendicular relative to the axis of rotation of the electric motor.

12. The vehicle according to claim 11, further comprising a speed reduction system mounted in the first housing portion and connected to the hypoid gear set.

13. The vehicle according to claim 12, wherein the speed reduction system comprises a planetary gear set.

14. The vehicle according to claim 13, wherein the planetary gear set comprises a two-speed transmission.

15. The vehicle according to claim 11, wherein the second housing portion comprises a torque tube.

16. The vehicle according to claim 15, further comprising a drive shaft extending from the electric motor toward the hypoid gear set through the torque tube.

17. The vehicle according to claim 11, wherein the torque arm includes a first torque arm and a second torque arm, each of the first and second torque arms being pivotally connectable to the vehicle chassis.

18. The vehicle according to claim 11, further comprising a bushing mounted in the torque arm, the bushing allowing the housing to pivot about the support axis relative to the vehicle chassis.

19. The vehicle according to claim 11, further comprising a connector mounted to the third housing portion, the connector providing an electrical and a cooling interface for the electric motor.

20. The vehicle according to claim 11, wherein the first housing portion, the second housing portion and the third housing portion extend along a longitudinal axis that is coincident with the axis of rotation of the electric motor.

\* \* \* \* \*